Patented Mar. 2, 1954

2,671,022

UNITED STATES PATENT OFFICE 2,671,022

POLYVINYL ALCOHOL GELS AND PHOTOGRAPHIC SILVER HALIDE EMULSIONS CONTAINING BERYLLIUM COMPOUNDS

Donald E. Sargent, Easton, Pa., and John C. Bailar, Jr., Urbana, Ill., assignors to General Aniline & Film Corporation, New York, N. Y., a corporation of Delaware No Drawing. Application June 24, 1949, Serial No. 101,264

13 Claims. (Cl. 95—7)

The present invention relates to the preparation of polyvinyl alcohol gels and to such gels which constitute, inter alia, colloids useful in photography.

As is well known, natural gelatins are almost universally employed as the protective colloid in photographic emulsions. Despite this fact, these natural products have serious shortcomings which have kindled a strong desire in the art for the creation of gelatin substitutes free from the objections to gelatin.

Among the shortcomings of gelatin are variability in physical properties and in chemical composition which lead to variations in the physical and photographic properties of the finished photographic emulsion and to variations in the susceptibility of the silver halides thereof to sensitizing and desensitizing substances, developing agents, and the like; brittleness when dry so that photographic products carrying emulsion layers containing gelatin crack rather easily, particularly printing papers so prepared; low resistance to the action of bacteria and molds; susceptibility to the action of strongly alkaline reagents; low "melting points" when wet, making it necessary to process the photographic material at relatively low temperature, i. e., on the order of 15 to 25° C.

Any useful gelatin substitute should possess the gel-forming and protective colloid action of gelatin but be free from the aforementioned disadvantages. Such a material should have fairly constant physical and chemical properties allowing emulsions of constant properties to be prepared, should be superior to gelatin as a film-forming material, and should not be attacked by bacteria or molds.

Polyvinyl alcohol is a high molecular weight, water-soluble polymer which yields tough transparent films when its aqueous solutions are dried. It is readily available and the chemical and physical properties of any given grade are fairly constant. Commercially it is manufactured by hydrolyzing polyvinyl acetate partially or completely to give a variety of products. The term "polyvinyl alcohol" as herein used also includes water-soluble hydrolyzed polyvinyl esters having a polyvinyl ester content of less than 25%, the remainder being polyvinyl alcohol. The structure of a completely hydrolyzed polyvinyl ester may be represented schematically by the following formula:

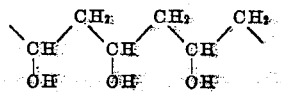

It will be noted from this formula that alternate carbon atoms are substituted by hydroxyl groups. It is to these hydroxyl groups that the water solubility of the product is attributable. There is interaction (hydrogen bonding) between these hydroxyl groups and water and between the hydroxyl groups of adjacent chains so that the solutions in water show an appreciable viscosity. Unfortunately, however, these forces are not sufficient per se to cause the product to gel on standing at room temperature or upon cooling.

Considerable work has been done in an effort to convert polyvinyl alcohol into a material which would possess the properties aforesaid and would serve as an effective gelatin substitute. For the most part, this work was predicated upon the use of organic compounds as the gelling agents. One exception is provided by USP 2,376,371 which suggests the employment of boron compounds, such as boric acid, and the like, for gelling polyvinyl alcohol. This action was to be expected for the reason that it is known that boric acid and similar boron derivatives undergo ester or complex formation with polyhydroxy compounds, such as glycerine, carbohydrates, and the like (see for example the bottom of page 1609 of "Organic Chemistry" by Gilman, vol. II, second edition). It could therefore be assumed that the same action would be portrayed in connection with polyvinyl alcohol and that such action could easily lead to a cross-linked or gelled structure.

We have now found, suprisingly, that beryllium compounds possess the ability to gel polyvinyl alcohol in conjunction with a basic material to an even greater degree than do boron compounds, such as boric acid despite the marked difference between these two types of compounds. The difference is illustrated by fact that it is well known that boron is distinctly non-metallic (see for example, Latimer and Hildebrand, Reference Book of Inorganic Chemistry, The McMillan Company, New York, 1940, page 80, second paragraph) while beryllium is classified as a metal (ibid, page 57). Because of this, the hydroxide of boron (B[OH]₃) is an acid while the hydroxide of beryllium (Be[OH]₂) is a base. Furthermore, boron never appears as the B+++ cation when its compounds are dissolved in water, but always occurs in an anion in combination with another non-metal such as oxygen for example the BO₂— and B₄O₇— — anions. By way of contrast beryllium compounds in aqueous solution readily yield the Be++ cation which is typical of the behavior of salts of the metals.

It may also be noted that beryllium appears in the same group of the periodic system with magnesium, calcium, strontium, barium, zinc and cadmium. Like the hydroxide of beryllium, the hydroxides of these other metallic elements exhibit the characteristics of bases. Because of this, it was to be presumed that the gelling action of beryllium compounds would be comparable to that of similar compounds of the metals most closely related thereto, i. e., of those which have the same valence and appear in the same group of the periodic system. Investigation has shown however that aqueous solutions of the salts of magnesium, calcium, strontium, barium, zinc and cadmium when added to an aqueous solution of polyvinyl alcohol, followed by addition of a basic material effect very little or no gelling action on the polyvinyl alcohol. In face with magnesium and calcium compounds, the hydroxides may precipitate. With zinc and cadmium compounds, on the other hand, while, semi-opaque heterogeneous masses are formed which may precipitate and which exhibit few of the desirable characteristics of a clear tough homogeneous gel. It was therefore suprising, that solutions of beryllium compounds, unlike those of its congeners form gels with polyvinyl alcohol upon treatment with a basic material.

Furthermore it is well known that compounds of beryllium are often similar to compounds of aluminum in both physical and chemical properties. Never-the-less the above-noted gelling action of beryllium compounds is not shared by aluminum compounds.

The beryllium compound-polyvinyl alcohol gels are even stronger than those formed with boron compounds. This is probably attributable to the fact that in many cases the boron compounds, being derived from a trivalent element, form structures which are too highly cross-linked and are therefore rigid and too easily shared, whereas the beryllium compounds, being derived from an element which is only divalent, form more elastic gel structures.

Our discovery, which as noted, is quite unexpected, involves the preparation of colorless gels having a very high mechanical strength and eminently suitable for the preparation of photographic emulsions by adding to polyvinyl alcohol solutions a solution of a water soluble beryllium compound followed by treatment with a basic material. This gelling action may be due to the formation of beryllium hydroxide in situ from the beryllium compound and the reaction of the hydroxide with the chain-like molecules of the polyvinyl alcohol. It is to be understood, however, that this explanation is merely given as a possible illustration of the mechanism of the reaction and is not being submitted as an actual indication of the reaction which takes place.

Clear, tough, high melting polyvinyl alcohol gels containing soluble beryllium compounds and a basic substance and the preparation of such gels constitute the purposes and objects of the present invention.

The gels contemplated herein are produced by adding to a water solution of polyvinyl alcohol, a water soluble compound of beryllium and then modifying the pH of the resulting mixture by treatment with a water soluble basic material. Such treatment may be effected in various ways. One method involves the addition to the mixture of the polyvinyl alcohol and the beryllium compound, a solution of a water soluble basic material such as sodium hydroxide, potassium hydroxide, sodium carbonate, ammonia, ammonium carbonate, or the like. Alternatively, the solution of the polyvinyl alcohol and beryllium compound may be coated on a suitable support and gelation effected by fuming the coating with a volatile base such as ammonia or an organic amine such as methylamine, ethylamine, ethylenediamine, or the like, or by dipping the coated support into an aqueous solution of a base, either organic or inorganic, of the type previously mentioned.

Any water soluble beryllium compound may be used for the intended purpose. Examples of such compounds are beryllium nitrate, beryllium chloride, beryllium bromide, or the like.

The quantity of the beryllium compound which is employed may vary and will generally range from about ½ to 10% by weight of the polyvinyl alcohol used. For the best results it is preferred to employ the beryllium compound in an amount ranging from about 1 to 5% by weight of the polyvinyl alcohol. The exact amount used may depend upon the molecular weight of the polyvinyl alcohol used and the properties desired in the finished product.

The aforesaid polyvinyl alcohol-beryllium compound complexes may be conveniently employed for the preparation of light sensitive photographic silver halide elements by adding to an aqueous solution of polyvinyl alcohol an alkali metal halide such as sodium bromide, sodium chloride, potassium bromide, potassium chloride, or the like, and precipitating therein a silver halide in a finely dispersed state by the addition of a soluble silver salt such as silver nitrate, while continuously stirring the mass. A water soluble beryllium compound is then added, while stirring, and the resulting composition is coated on a suitable support and gelled by treatment with a basic material as previously outlined. Following the addition of the soluble silver salt, it may be desirable to ripen the emulsion by stirring it at a somewhat elevated temperature, i. e., 35 to 75° C. for a short time or to add auxiliary agents such as sensitizers, desensitizers, ripening agents, dispersing agents, and the like. Flourescing agents such as those described by Sargent in copending applications Serial Nos. 69,841 filed January 7, 1949, now Patent No. 2,582,357; 72,277 filed January 22, 1949, now Patent No.2,555,138; and 75,738 filed February 10, 1949, now Patent No. 2,571,706, may also be added.

It is to be understood that the above procedure need not be strictly followed in producing the light sensitive silver halide elements. Thus beryllium compound may be added prior to the addition of the alkali metal halide and the soluble silver salt with equally good results.

The remarkable gelling action of the beryllium compound is demonstrated by the fact that coatings prepared with the polyvinyl alcohol-beryllium compound complexes are proof against boiling water, whereas if the beryllium compounds are omitted in the preparation of the coatings, solution in boiling water occurs quite readily.

*Example I*

To 100 parts of a 10% solution of polyvinyl alcohol (Dupont Elvanol 52–22) are added 5 parts of a 10% solution of beryllium nitrate

$(Be[NO_3]_2 \cdot 3H_2O)$ with continuous stirring until a homogeneous solution results. 10 parts of a 10% sodium hydroxide solution are then added with stirring whereupon the solution is almost instantaneously converted into a stiff, colorless, transparent gel which does not dissolve readily in boiling water.

*Example II*

To a solution of 125 parts of a 10% polyvinyl alcohol solution (Dupont Elvanol 52-22), is added, with stirring, a solution of 0.9 part of sodium chloride and 0.5 part of beryllium nitrate dissolved in 25 parts of distilled water. The solution is heated to 50° C. and, in yellow light, a solution of 1.875 parts of silver nitrate in 15 parts of distilled water is added with continuous stirring. After stirring in yellow light for 15 minutes at 15° C., the resulting fluid silver chloride emulsion is coated on a paper base and allowed to cool. The base is then exposed to ammonia fumes until the coating sets to a tough water-insoluble gel. The coating is then dried in the dark. The light sensitive element so prepared is very suitable for making prints from photographic negatives and is not adversely affected by the usual treating baths as is unmodified polyvinyl alcohol emulsion coatings.

*Example III*

The procedure is the same as in Example II excepting that the coating is fumed with methylamine rather than with ammonia. The results obtained are substantially the same as those of Example II.

*Example IV*

The procedure is the same as in Example II excepting that the coating is effected on cellulose acetate base and is set by bathing the coating for a short time in a 5% solution of sodium hydroxide, followed by water washing, and drying.

*Example V*

The procedure is the same as in Example I excepting that the beryllium nitrate is replaced by an equivalent amount of beryllium chloride. The gel obtained resembles that of Example I.

*Example VI*

The procedure is the same as in Example I excepting that the beryllium nitrate is replaced by an equivalent amount of beryllium bromide. A clear, tough gel also results in this case.

It should be understood that the gels formed as herein noted can be used for purposes other than the preparation of photographic products. Such gels may be employed, for example, as thickening and gelling agents in water paints, printing inks, and many other applications where thickening or gelling compositions are required.

Various modifications of the invention will occur to persons skilled in this art, and we therefore do not intend to be limited in the patent granted except as necessitated by the appended claims.

We claim:

1. The method of preparing a tough, colorless gel which comprises mixing an aqueous solution of polyvinyl alcohol with a water soluble inorganic beryllium salt in a gelling amount and treating the mixture with a water soluble inorganic basic material.

2. The method of preparing a tough, colorless gel which comprises mixing an aqueous solution of polyvinyl alcohol with a water soluble inorganic beryllium salt in a gelling amount and treating the mixture with a basic material selected from the class consisting of water soluble inorganic bases and volatile nitrogenous water soluble organic bases.

3. The process as defined in claim 2 wherein the mixing of the ingredients is effected without heating.

4. The process of producing a light sensitive photographic element comprising a silver halide uniformly dispersed in a tough, colorless gel of polyvinyl alcohol which comprises adding to an aqueous solution of polyvinyl alcohol, an alkali metal halide, adding silver nitrate while continuously stirring the mass, incorporating a water soluble inorganic beryllium salt in a gelling amount, and treating the composition with a basic material selected from the class consisting of water soluble inorganic bases and volatile nitrogenous water soluble organic base.

5. The method of preparing a tough, colorless gel which comprises mixing an aqueous solution of polyvinyl alcohol with beryllium nitrate in an amount ranging from about ½ to 10% by weight of the polyvinyl alcohol and treating the mixture with a water soluble inorganic basic material.

6. The process of producing a light sensitive photographic element comprising a silver halide uniformly dispersed in a tough, colorless gel of polyvinyl alcohol which comprises adding to an aqueous solution of polyvinyl alcohol, an alkali metal halide, adding silver nitrate while continuously stirring the mass, incorporating a water soluble inorganic beryllium salt in a gelling amount, coating the composition on a support and treating it with ammonia.

7. The process as defined in claim 4, wherein the berryllium salt is beryllium nitrate.

8. The process as defined in claim 4, wherein the beryllium salt is beryllium bromide.

9. The product of the process of claim 1.
10. The product of the process of claim 2.
11. The product of the process of claim 4.
12. The product of the process of claim 5.
13. The product of the process of claim 6.

DONALD E. SARGENT.
JOHN C. BAILAR, Jr.

References Cited in the file of this patent

UNITED STATES PATENTS

| Number | Name | Date |
| --- | --- | --- |
| 2,412,200 | Blum | Dec. 10, 1946 |
| 2,439,108 | Staehle | Apr. 6, 1948 |

OTHER REFERENCES

PVA Publication, Dupont R & H Technical Bulletin, 7 pp., copyright 1940, page 3 cited.